(12) United States Patent
Mullen et al.

(10) Patent No.: US 6,676,261 B2
(45) Date of Patent: Jan. 13, 2004

(54) RETROREFLECTIVE FILM PRODUCT

(75) Inventors: Patrick W. Mullen, Barkhamsted, CT (US); Edward D. Phillips, Oakville, CT (US)

(73) Assignee: Reflexite Corporation, Avon, CT (US)

( * ) Notice: Subject to any disclaimer, the term of this patent is extended or adjusted under 35 U.S.C. 154(b) by 0 days.

(21) Appl. No.: 09/949,306

(22) Filed: Sep. 7, 2001

(65) Prior Publication Data

US 2002/0071183 A1 Jun. 13, 2002

Related U.S. Application Data

(60) Provisional application No. 60/232,210, filed on Sep. 13, 2000.

(51) Int. Cl.[7] .............................................. G02B 5/122
(52) U.S. Cl. ...................................... 359/529; 359/530
(58) Field of Search ................................. 359/529, 530, 359/531, 532, 533

(56) References Cited

U.S. PATENT DOCUMENTS

| | | | |
|---|---|---|---|
| 3,684,348 A | | 8/1972 | Rowland ..................... 350/103 |
| 3,689,346 A | | 9/1972 | Rowland |
| 3,975,083 A | | 8/1976 | Rowland ..................... 350/103 |
| 5,229,882 A | * | 7/1993 | Rowland ..................... 359/530 |
| 5,491,586 A | | 2/1996 | Phillips ...................... 359/530 |
| 5,601,911 A | * | 2/1997 | Ochi ........................ 428/304.4 |
| 5,614,286 A | | 3/1997 | Bacon, Jr. et al. |
| 5,642,222 A | * | 6/1997 | Phillips ...................... 359/530 |
| 5,888,618 A | * | 3/1999 | Martin ........................ 428/156 |
| 6,325,515 B1 | * | 12/2001 | Coderre et al. ............. 359/530 |

* cited by examiner

*Primary Examiner*—Drew Dunn
*Assistant Examiner*—Leo Boutsikaris
(74) *Attorney, Agent, or Firm*—Hamilton, Brook, Smith & Reynolds, P.C.

(57) ABSTRACT

A retroreflective structure and method for forming the same are provided which includes a polyurethane sheet having a first side and a second side, a coating on the first side, and an array of retroreflective prism elements formed on the coating. The coating is used to promote adhesion between the prism elements and the first side of the polyurethane sheet. A second coating can be formed on the second side of the polyurethane sheet for purposes such as forming a protective layer over the polyurethane sheet and can include ultraviolet blocking material.

36 Claims, 1 Drawing Sheet

RETROREFLECTIVE FILM PRODUCT

RELATED APPLICATION

This application claims the benefit of U.S. Provisional Application No. 60/232,210, filed on Sep. 13, 2000, the entire teachings of which are incorporated herein by reference.

BACKGROUND OF THE INVENTION

Retroreflective materials are employed for various safety and decorative purposes. Particularly, these materials are useful at night time when visibility is important under low light conditions.

Many types of retroreflective material exist for various purposes. These retroreflective materials can be used as reflective tapes and patches for clothing, such as vests and belts. Also, retroreflective bands can be used on posts, barrels, traffic cone collars, highway signs, warning reflectors, etc. Retroreflective material comprise arrays of randomly oriented micron diameter spheres or close packed cube-corner (prismatic) arrays.

A description of the structures and operation of cube-corner microprisms can be found in U.S. Pat. No. 3,684,348, issued to Rowland on Aug. 15, 1972, the teachings of which are incorporated by reference herein. A method for making retroreflective sheeting is also disclosed in U.S. Pat. No. 3,689,346, issued to Rowland (Sep. 5, 1972), the teachings of which are incorporated by reference herein. The disclosed method is for forming cube-corner microprisms in a cooperatively configured mold. The prisms are bonded to sheeting which is applied thereover to provide a composite structure in which the cube-corner formations project from one surface of the sheeting.

However, known retroreflective products have not been sufficiently supple and pliable to be worn for example, on clothing articles. Additionally, known retroreflective products have suffered from good launderability performance, which is becoming more desirable with the increased demand for clothing articles having retroreflective products thereon, such as running apparel and the like.

SUMMARY OF THE INVENTION

A retroreflective structure and method for forming the same are provided which includes a polyurethane sheet having a first side and a second side, a coating on the first side, and an array of retroreflective prism elements formed on the coating. Preferably, the polyurethane sheet has a thickness between about 25.4 and 127 micrometers (1 and 5 mils), and more preferably between about 50.8 and 76.2 micrometers (2 and 3 mils). In one embodiment, the array of retroreflective elements include cube-corner prism elements which have a window side and a facet side. Preferably, the window sides face the polyurethane sheet.

The coating can be used for purposes such as promoting adhesion between the prism elements and the first side of the polyurethane sheet. The coating can include a urethane coating which can also include a polyaziridine or isocyanate cross-linking agent. The coating can have a thickness in the range of between about 2.5 and 25 micrometers (0.1 and 1.0 mils). Preferably, the coating has a thickness in the range of between about 2.5 and 12.5 micrometers (0.1 and 0.5 mils).

A second coating can be formed on the second side of the polyurethane sheet for purposes such as forming a protective layer over the polyurethane sheet and can include ultraviolet blocking material. The coating can include a urethane coating which can also include a polyaziridine cross-linking agent. The coating can have a thickness in the range of between about 5 and 25 micrometers (0.2 and 1.0 mils). Preferably, the coating has a thickness in the range of between about 5.0 and 12.5 micrometers (0.2 and 0.5 mils).

In one embodiment, the array of retroreflective elements are cube-corner prisms. A reflective coating, such as a metallized coating, can be formed over the array of retroreflective elements. A backing layer can be provided over the array of retroreflective elements.

In high melt embodiments, a retroreflective structure is provided which includes a low melt temperature polyurethane sheet having a first side and a second side, a high melt temperature polyurethane sheet disposed on the first side of the low melt temperature polyurethane sheet, and an array of retroreflective prism elements disposed on the second side of the low melt temperature polyurethane sheet. The high melt temperature polyurethane sheet can include slip agents, such as a wax or metal soap.

The present invention has many advantages including being sufficiently thin to be flexible for placing on clothing. Further, the structure is sufficiently durable to withstand multiple washes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. The features and other details of the method and apparatus of the invention will now be more particularly described with reference to the accompanying drawings and pointed out in the claims. It will be understood that the particular embodiments of the invention are shown by way of illustration and not as limitations of the invention. The principle features of this invention can be employed in various embodiments without departing from the scope of the invention.

Figure 1:
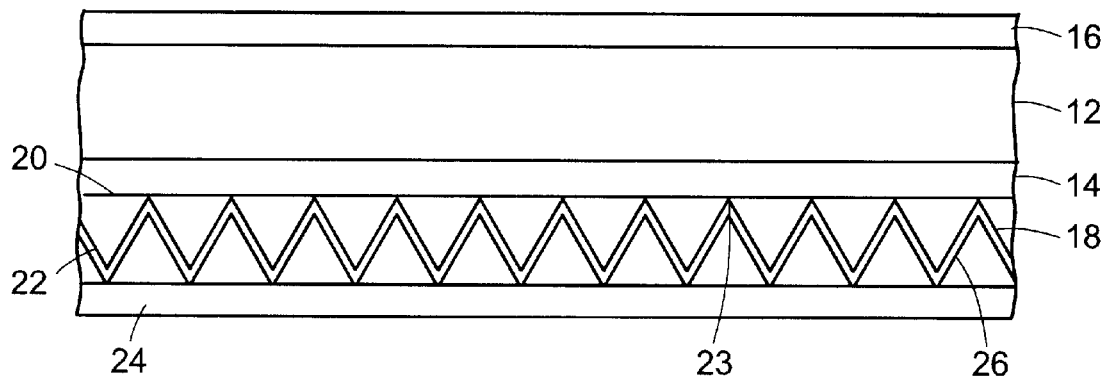
FIG. 1 is a partial cross-sectional view of an embodiment of a retroreflective structure in accordance with the present invention.

One embodiment of the invention, as shown in FIG. 1 in a cross-sectional view, is retroreflective structure 10. Generally, the retroreflective structure 10 is formed of a polyurethane sheet or film 12 having an optional first coating 14 and an optional second protective coating 16 formed on either side, and a non-extensible retroreflective prism array 18, which can be formed on the first coating. The first coating 14 can be used to promote adhesion between the prism array 18 and the film 12. That is, the first coating 14 can serve as a tie coat for bonding the prism array 18 to the first coating. The second coating 16 can be used to form a protective layer over film 12 and can include ultraviolet blocking material or coloring pigment/dye.

Film 12 comprises a polyurethane polymer that is transparent to visible light. Alternatively, the polymer can be a copolymer or terpolymer of a polyurethane and polyester, polyether or polycaprolactone. In one embodiment, film 12 includes an Elastollan® thermoplastic polyurethane elastomer, which is manufactured by BASF Corporation of Wyandotte, Mich.

Film 12 may have a thickness in the range of between about 25.4 and 127 micrometers (1 and 5 mils). In a preferred embodiment, the thickness is in the range of between about 50.8 and 76.2 micrometers (2 and 3 mils). The selected thickness is dependent upon the method of fabrication, the polymer and the characteristics desired for the retroreflective structure 10. In one embodiment, the retroreflective structure 10 is thin and flexible enough so that it can be worn on clothing articles.

The first and second coatings 14, 16, in one embodiment, comprise a urethane coating. The urethane coating can include a polyaziridine or isocyanate cross-linking agent. In alternative embodiments, the coatings 14, 16 can include acrylics and polyesters. The first coating 14 may have a thickness in the range of between about 2.5 and 25 micrometers (0.1 and 1.0 mils). In a preferred embodiment, the thickness is in the range of between about 2.5 and 12.5 micrometers (0.1 and 0.5 mils). The second coating 16 may have a thickness in the range of between about 2.5 and 25 micrometers (0.1 and 1.0 mils). In a preferred embodiment, the thickness is in the range of between about 5.0 and 12.5 micrometers (0.2 and 0.5 mils). In one embodiment, the coatings 14, 16 include NeoRez R-960 urethane, which is manufactured by Zeneca Resins of Wilmington, Mass.

The prism array 18 consists of retroreflective cube-corner prism elements. Prism array 18 has a window side 20 and facet sides 22. Prism array 18 is formed of a transparent polymer. Preferably, the polymer has a high modulus of elasticity. After being formed, the polymer is substantially rigid, which is defined as being substantially inflexible in order to maintain its dihedral angles. The polymer is preferably non-extensible, which is defined as not being capable of being substantially stretched without breaking. The polymer can be selected from a wide variety of polymers that are considered rigid. These polymers include the polymers of urethane, acrylic acid esters, cellulose esters, ethylenically unsaturated nitrites, hard epoxy acrylates, etc. Other polymers include polycarbonates, polyesters and polyolefins, acrylated silanes, hard polyester urethane acrylates. Preferably, the polymer can be cast in a prismatic mold with a monomer or oligomer polymerization initiated by ultraviolet radiation.

The rigid prisms of the array 18, in one embodiment, are cube-corner in shape and have a length along each cube-side edge in the range of between about 101.6 and 508 micrometers (4 and 20 mils). In one embodiment, each cube-side edge has a length of about 152.4 micrometers (6 mils). Preferably, each cube-side edge has a length of between about 101.6 and 203.2 micrometers (4 and 8 mils).

In one embodiment, the thickness of prism array 18 at valley 23, where the prism elements intersect, is sufficiently thin so that prism array 18 can crack and split along valleys 24 when a minimal tensile or flexing force is applied to retroreflective structure 10. This allows the structure 10 to flex, whereby the prism elements are not significantly distorted, thereby significantly maintaining the retroreflective properties of structure 10. After the force is relaxed, retroreflective structure 10 substantially returns to its pre-stretched size and shape without significantly diminishing the retroreflective properties or aesthetic appearance of the structure. In one embodiment, the thickness of prism array 18 is in the range of between about 71.12 and 228.6 micrometers (2.8 and 9 mils).

Film 12 provides a transparent, flexible substrate to prism array 18 to provide a smooth surface upon which first and second coatings 14, 16 can attach. In an alternative embodiment, the prism array 18 can attach directly to film 12.

A backing layer 24 can be applied over the prism array 18 to attach the retroreflective structure 10 to another substrate, such as a clothing article. If the first coating 14 or an adhesive is used to attach the prism facets 22 to film 12, the adhesive can cause the surface of the prisms to wet the surface of the prisms, thereby destroying the air interface and eliminating the ability of the prism to retroreflect. As a result, reflective coating 26 can be deposited on the surface of the dihedral facets 22. Typically, the reflective coatings 26 are formed by sputtering aluminum, silver or gold or by vacuum metallization. Alternatively, metal lacquers, dielectric coatings and other specular coating materials can be employed.

Figure 2:
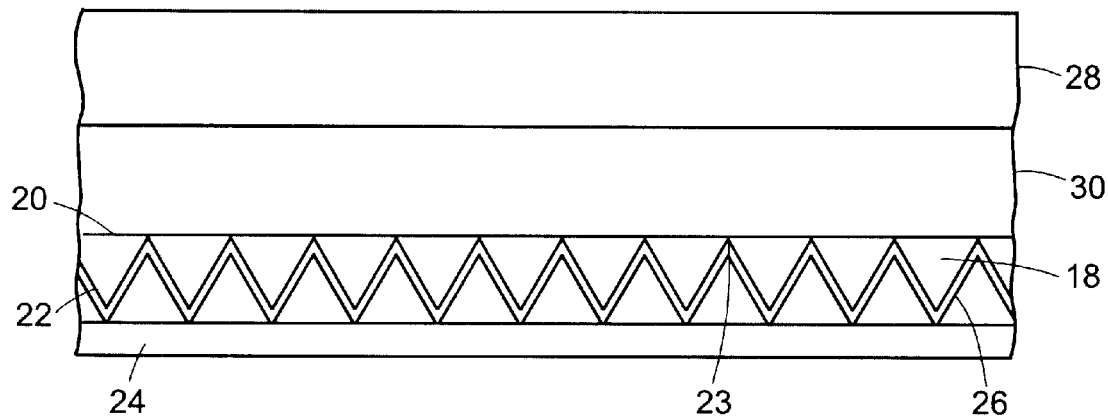
FIG. 2 is a partial cross-sectional view of another embodiment of a retroreflective structure in accordance with the present invention.

FIG. 2 is a partial cross-sectional view of another embodiment of a retroreflective structure 11 in accordance with the present invention. In this embodiment, a film or sheet 28 is disposed adjacent to a second film or sheet 30. In one embodiment, sheet 28 is formed from a cross-linked thermoset film, and can have a higher melting temperature than sheet 30. In a particular embodiment, sheet 28 is a high melt temperature polyurethane film. A high melt temperature is defined as one that has a melt temperature in the range of about 110 to 130° C. In one embodiment, sheet 28 includes a polyester based aliphatic thermoplastic polyurethane, such as Morthane® PN3429-218 manufactured by Morton International, Inc. Sheet 28 can include slip agents, for example, waxes or metal soaps, to prevent blocking or sticking of the sheet 28, for example, when rolled up on itself.

Sheet 30 is formed from a material that adheres to sheet 28 and prism array 18. In a particular embodiment, sheet 30 is a low melt temperature polyurethane film. A low melt temperature is defined as one that has a melt temperature in the range of about 90 to 110° C. In one embodiment, sheet 30 includes a polycaprolactone based aliphatic thermoplastic polyurethane, such as Morthane® PN03-214, also manufactured by Morton International, Inc.

To form the retroreflective structure 11 of FIG. 2, the sheet 28 is extruded into a carrier sheet and sheet 30 is then extruded onto sheet 28. The prism array 18 is then cast onto sheet 30 by, for example, the method disclosed in U.S. Pat. No. 3,689,346, issued to Rowland on Sep. 5, 1972, the teachings of which are incorporated herein by reference. The carrier sheet is then removed to leave the retroreflective structure 11 of FIG. 2. Alternatively, the extruded sheets 28 and 30 on the carrier sheet can be purchased from Specialty Extrusion, Inc. of Phoenixville, Pa.

In one embodiment, each sheet 28, 30 can have a thickness in the range of between about 76.2 and 254 micrometers (3 and 10 mils), and in a particular embodiment, each sheet has a thickness of about 127 micrometers (5 mils).

While this invention has been particularly shown and described with references to preferred embodiments thereof, it will be understood by those skilled in the art that various changes in form and details may be made therein without departing from the scope of the invention encompassed by the appended claims.

What is claimed is:

1. A retroreflective structure comprising:
   a polyurethane sheet having a first side and a second side;
   a first coating on the first side of the polyurethane sheet;
   a second coating on the second side of the polyurethane sheet; and
   an array of retroreflective prism elements disposed on the first coating.

2. The retroreflective structure of claim 1 wherein the polyurethane sheet has a thickness between about 1 and 5 mils.

3. The retroreflective structure of claim 1 wherein the polyurethane sheet has a thickness between about 2 and 3 mils.

4. The retroreflective structure of claim 1 wherein the first coating includes a urethane coating.

5. The retroreflective structure of claim 4 wherein the first coating further includes a polyaziridine cross-linking agent.

6. The retroreflective structure of claim 1 wherein the first coating includes a thickness in the range of between about 0.1 and 1.0 mils.

7. The retroreflective structure of claim 1 wherein the second coating includes a urethane coating.

8. The retroreflective structure of claim 7 wherein the second coating further includes a polyaziridine cross-linking agent.

9. The retroreflective structure of claim 1 wherein the second coating includes a thickness in the range of between about 0.2 and 1.0 mils.

10. The retroreflective structure of claim 1 wherein the array of retroreflective elements are cube-corner prisms.

11. The retroreflective structure of claim 1 further comprising a reflective coating disposed over the array of retroreflective elements.

12. The retroreflective structure of claim 11 wherein the reflective coating includes a metallized coating.

13. The retroreflective structure of claim 1 further comprising a backing layer disposed over the array of retroreflective elements.

14. A retroreflective structure comprising:
    a polyurethane sheet having a first side and a second side;
    a first coating disposed on the first side of the polyurethane sheet;
    a second coating disposed on the second side of the polyurethane sheet; and
    a prism array including cube-corner elements disposed on the first coating, each cube-corner element having a window side and a facet side, the window sides facing the polyurethane sheet.

15. The retroreflective structure of claim 14, wherein each coating includes a urethane coating and a polyaziridine cross-linking agent.

16. A method of forming a retroreflective structure comprising:
    forming a polyurethane sheet having a first side and a second side;
    forming a first coating on the first side of the polyurethane sheet;
    forming a second coating on the second side of the polyurethane sheet; and
    forming an array of retroreflective prism elements on the first coating.

17. The method of claim 16 further comprising of the step of forming a reflective coating on the retroreflective prism elements.

18. A retroreflective structure, comprising:
    a first polyurethane sheet having a first side and a second side;
    a second polyurethane sheet disposed on the first side of the first polyurethane sheet; and
    an array of retroreflective prism elements disposed on the second side of the first polyurethane sheet.

19. The retroreflective structure of claim 18 wherein the second polyurethane sheet has a higher melting point than the first polyurethane sheet.

20. The retroreflective structure of claim 18 wherein the second polyurethane sheet has a melt temperature in the range of about 110 to 130° C.

21. The retroreflective structure of claim 18 wherein the first polyurethane sheet has a melt temperature in the range of about 90 to 110° C.

22. The retroreflective structure of claim 18 wherein the second polyurethane sheet includes at least one slip agent.

23. The retroreflective structure of claim 22 wherein the at least one slip agent includes waxes or metal soaps.

24. A method of forming a retroreflective structure comprising:
    providing a first polyurethane sheet having a first side and a second side;
    providing a second polyurethane sheet on the first side of the first polyurethane sheet; and
    forming an array of retroreflective prism elements on the second side of the first polyurethane sheet.

25. The method of claim 24 further comprising providing slip agents in the second polyurethane sheet.

26. The method of claim 24 further comprising forming the second polyurethane sheet from a material that has a higher melting temperature, as formed, than the first polyurethane sheet, as formed.

27. The method of claim 24 wherein the second polyurethane sheet includes a high melt temperature polyurethane.

28. The method of claim 24 wherein the first polyurethane sheet includes a low melt temperature polyurethane.

29. A retroreflective structure comprising:
    a first polyurethane sheet and a second polyurethane sheet disposed on one another; and
    an array of retroreflective prism elements disposed on the first polyurethane sheet.

30. The retroreflective structure of claim 29 wherein the second polyurethane sheet includes a polyester-based aliphatic thermoplastic polyurethane.

31. The retroreflective structure of claim 29 wherein the first polyurethane sheet includes a polycaprolactone-based aliphatic thermoplastic polyurethane.

32. The retroreflective structure of claim 29 wherein the second polyurethane sheet includes a high melt temperature polyurethane.

33. The retroreflective structure of claim 29 wherein the first polyurethane sheet includes a low melt temperature polyurethane.

34. A retroreflective structure comprising:
    a polyurethane sheet having a first side and a second side;
    a coating on the first side of the polyurethane sheet;
    an array of retroreflective prism elements disposed on the second side of the polyurethane sheet; and
    a layer disposed between the second side of the polyurethane sheet and the prism elements.

35. The retroreflective structure of claim 34, wherein the layer includes a tie coat for bonding the polyurethane sheet to the prism elements.

36. The retroreflective structure of claim 34, wherein the layer includes a second polyurethane sheet.

* * * * *